United States Patent
Cheng et al.

(10) Patent No.: US 11,391,287 B2
(45) Date of Patent: Jul. 19, 2022

(54) ADVANCED REAL TIME GRAPHIC SENSORLESS ENERGY SAVING PUMP CONTROL SYSTEM

(71) Applicant: Fluid Handling LLC., Morton Grove, IL (US)

(72) Inventors: Andrew A. Cheng, Wilmette, IL (US); James J. Gu, Buffalo Grove, IL (US); Pradipkumar B. Patel, Des Plaines, IL (US); Kyle D. Schoenheit, Waterloo, NY (US)

(73) Assignee: FLUID HANDLING LLC, Morton Grove, IL (US)

( * ) Notice: Subject to any disclaimer, the term of this patent is extended or adjusted under 35 U.S.C. 154(b) by 456 days.

(21) Appl. No.: 15/217,070

(22) Filed: Jul. 22, 2016

(65) Prior Publication Data

US 2017/0107992 A1    Apr. 20, 2017

Related U.S. Application Data

(60) Provisional application No. 62/196,355, filed on Jul. 24, 2015.

(51) Int. Cl.
*F04D 27/00* (2006.01)
*F04D 15/00* (2006.01)
(Continued)

(52) U.S. Cl.
CPC .......... *F04D 27/001* (2013.01); *F04D 13/12* (2013.01); *F04D 15/0088* (2013.01); *G05B 13/021* (2013.01)

(58) Field of Classification Search
CPC .. F04D 27/001; F04D 15/0088; G05B 13/021
(Continued)

(56) References Cited

U.S. PATENT DOCUMENTS

| | | |
|---|---|---|
| 5,326,476 A | 7/1994 | Grogan et al. |
| 5,742,500 A | 4/1998 | Irvin |

(Continued)

FOREIGN PATENT DOCUMENTS

WO    20140089693 A1    6/2014

OTHER PUBLICATIONS

"AQUASAFE" http://www.aquasafeonline.net/en/waterdistribution.asp.
(Continued)

*Primary Examiner* — Robert A Cassity
(74) *Attorney, Agent, or Firm* — Ware, Fressola, Maguire & Barber LLP

(57) ABSTRACT

Apparatus includes a signal processor that receives signaling containing information about real time pump operating parameters related to pumps forming part of a pumping system in a plant/facility, and a user input selecting a pump for displaying the real time pump operating parameters on a control monitor to allow a plant/facility operator to implement a centralized pump control of the pumps at a given centralized location; and that determines corresponding signaling containing information to display on the control monitor the real time pump operating parameters to allow the plant/facility operator to implement the centralized control of the pumps at the given centralized location, based upon the signaling received.

22 Claims, 6 Drawing Sheets

Variable speed pump controls with advanced energy saving and sensorless control technologies.

(51) Int. Cl.
*F04D 13/12* (2006.01)
*G05B 13/02* (2006.01)

(58) Field of Classification Search
USPC .......................................................... 700/282
See application file for complete search history.

(56) References Cited

U.S. PATENT DOCUMENTS

| | | | |
|---|---|---|---|
| 5,964,724 | A | 10/1999 | Rivera et al. |
| 7,318,892 | B2 | 1/2008 | Connell et al. |
| 7,343,224 | B2 | 3/2008 | DiGianfilippo et al. |
| 7,351,340 | B2 | 4/2008 | Connell et al. |
| 7,429,299 | B2 | 9/2008 | McGlinchy et al. |
| 7,435,581 | B2 | 10/2008 | West |
| 8,051,383 | B2 | 11/2011 | McCampbell et al. |
| 8,078,326 | B2 | 12/2011 | Harrod et al. |
| 8,087,593 | B2 | 1/2012 | Leen |
| 8,234,014 | B1 | 7/2012 | Ingle |
| 8,346,396 | B2 | 1/2013 | Amundson et al. |
| 8,876,013 | B2 | 11/2014 | Amundson et al. |
| 9,081,405 | B2 | 7/2015 | Weaver et al. |
| 2005/0125083 | A1 | 6/2005 | Kiko |
| 2008/0082215 | A1 | 4/2008 | McDowell |
| 2008/0275853 | A1 | 11/2008 | Vail |
| 2009/0204237 | A1* | 8/2009 | Sustaeta ............. G05B 13/0285 700/36 |
| 2010/0017045 | A1 | 1/2010 | Nesler et al. |
| 2010/0152647 | A1 | 6/2010 | Shener et al. |
| 2010/0254825 | A1* | 10/2010 | Stiles, Jr. ................. F04B 49/20 417/20 |
| 2012/0029705 | A1 | 2/2012 | Broniak et al. |
| 2012/0173027 | A1* | 7/2012 | Cheng ................. F04D 15/0088 700/282 |
| 2013/0204546 | A1* | 8/2013 | Devine ................... F04B 51/00 702/45 |
| 2013/0268213 | A1* | 10/2013 | Gomez ..................... F04D 7/00 702/33 |
| 2014/0005841 | A1 | 1/2014 | Cheng et al. |
| 2014/0229023 | A1 | 8/2014 | Bomholt et al. |
| 2014/0249682 | A1 | 9/2014 | Cheng et al. |
| 2014/0288716 | A1 | 9/2014 | Cheng et al. |
| 2014/0309796 | A1 | 10/2014 | Mueller |
| 2015/0032271 | A1 | 1/2015 | Cheng et al. |
| 2015/0160660 | A1 | 6/2015 | Winkler et al. |
| 2015/0192317 | A1* | 7/2015 | Asmus ............... G05D 23/1917 700/22 |
| 2016/0010639 | A1 | 1/2016 | Cheng et al. |
| 2016/0017889 | A1* | 1/2016 | Cheng ................. F04D 15/0072 700/277 |
| 2016/0186889 | A1 | 6/2016 | Cheng et al. |
| 2016/0246290 | A1 | 8/2016 | Cheng et al. |

OTHER PUBLICATIONS

"Test stands for pumps" http://www.merecs.de/en/test-stands/pumpenpruefstand.html.

* cited by examiner

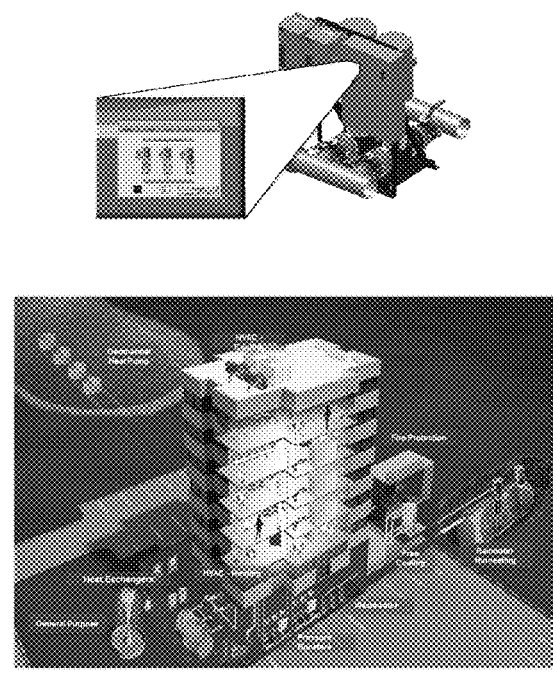
Figure 1: Variable speed pump controls with advanced energy saving and sensorless control technologies.
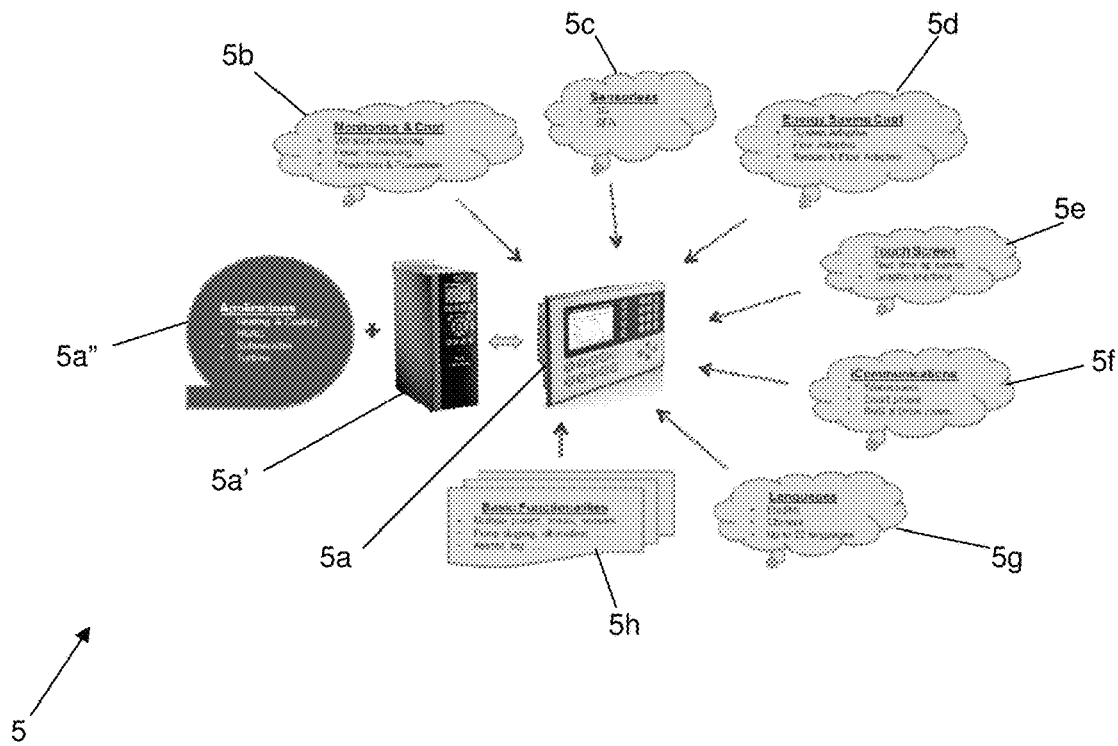
Figure 2A: Real Time Graphic Sensorless Energy Saving Pump Controllers system configuration.

Apparatus 10

Signal processor or processing module 10a configured at least to:

receive signaling containing information about real time pump operating parameters related to a multiplicity of pumps that form part of a plant or facility, and a user input selecting one of the multiplicity of pumps for displaying the real time pump operating parameters on a control monitor to allow a plant or facility operator to implement a centralized pump control of the multiplicity of pumps in the plant or facility at a given centralized location, based upon the signaling received;

determine corresponding signaling containing information to display on the control monitor the real time pump operating parameters to allow the plant or facility operator to implement the centralized control of the multiplicity of pumps in the plant or facility at the given centralized location, based upon the signaling received; and/or provide the corresponding signaling as control signaling to control the apparatus.

Other signal processor circuits or components 10b that do not form part of the underlying invention, e.g., including input/output modules, one or more memory modules, data, address and control busing architecture, etc.

Figure 2B

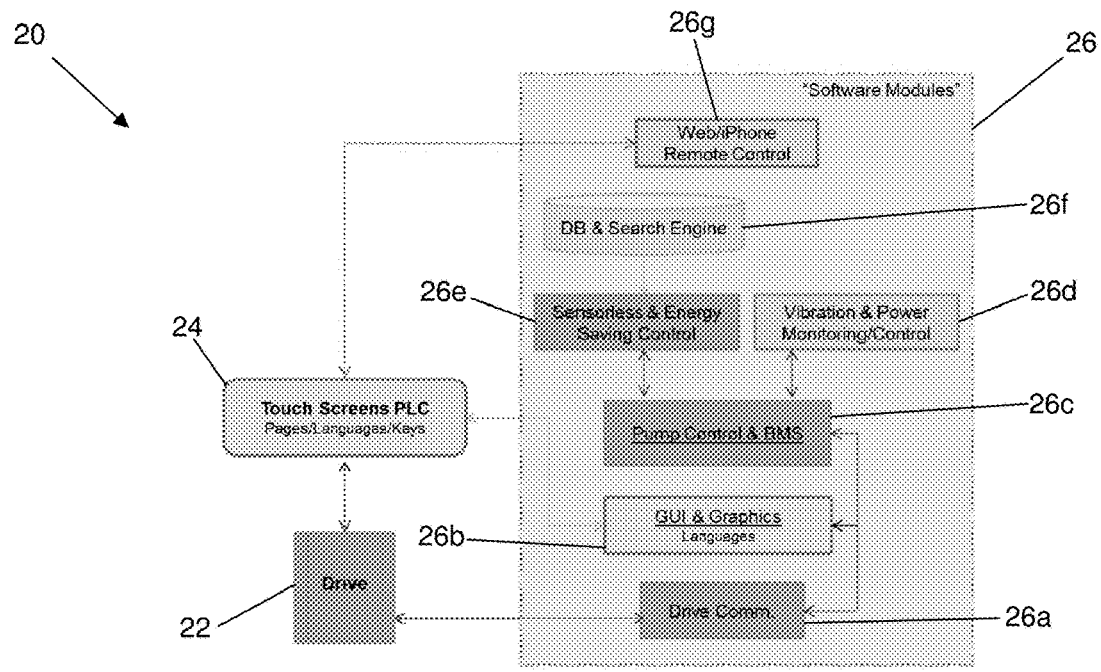
Figure 3: System software functional modules.
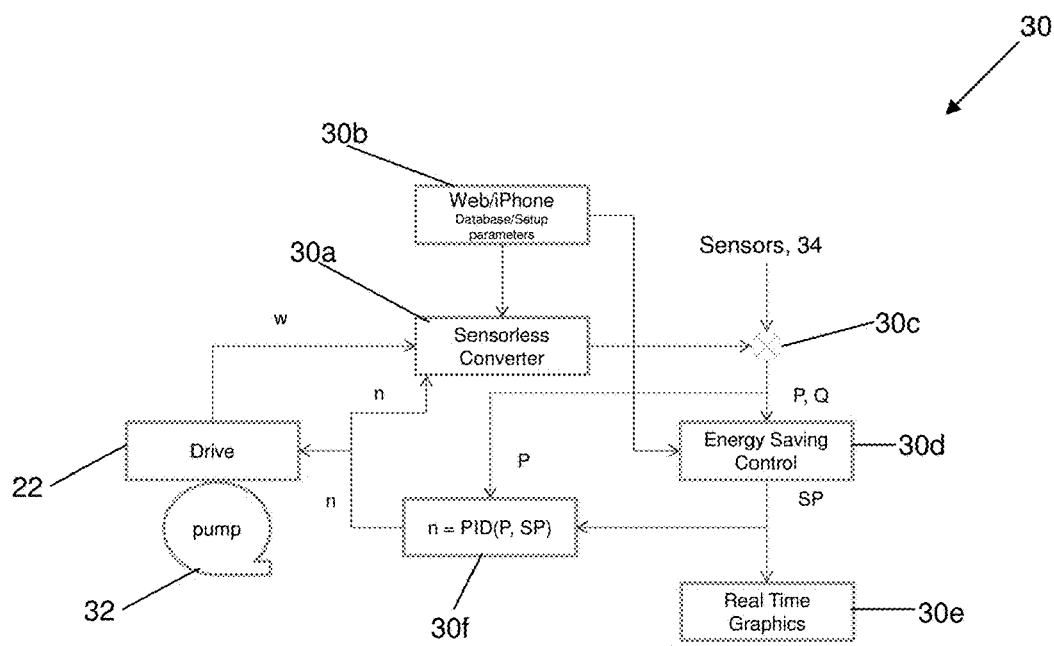
Figure 4: Flow chart for control signals I/Os.

Figure 5: Real Time Graphic Sensorless Energy Saving Pump Controllers.
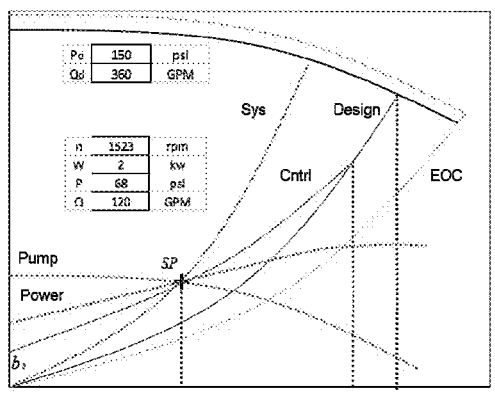
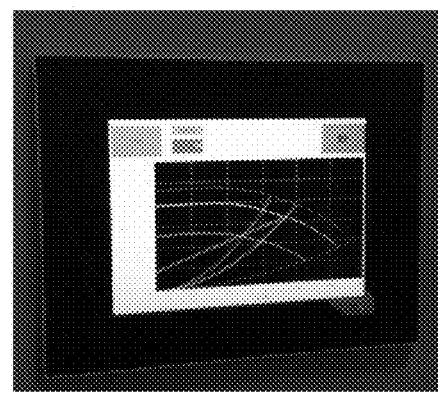
Fig. 6A  Fig. 6B
Real time pump_system_control operation curves screen design layout and prototype panel display.

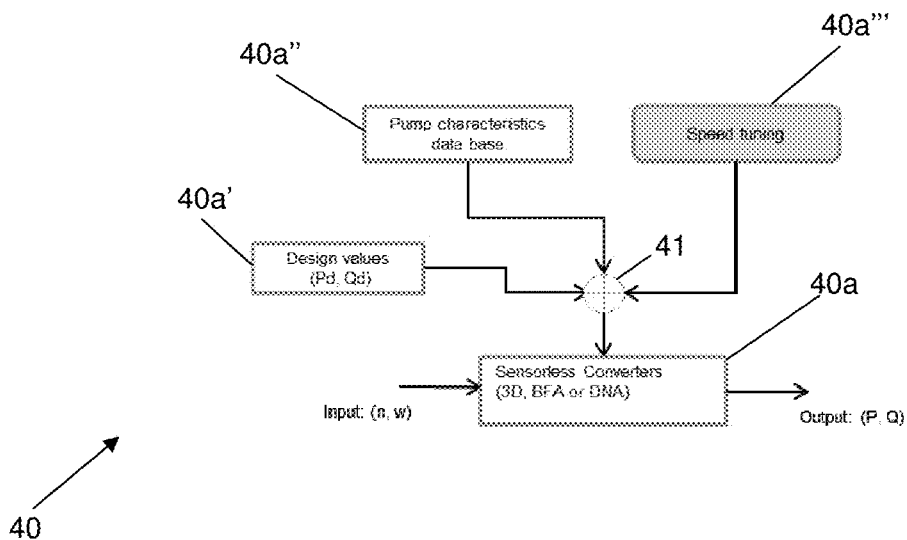
Figure 7: A sensorless converter module 40 for system flow rate and pressure from motor power and speed.
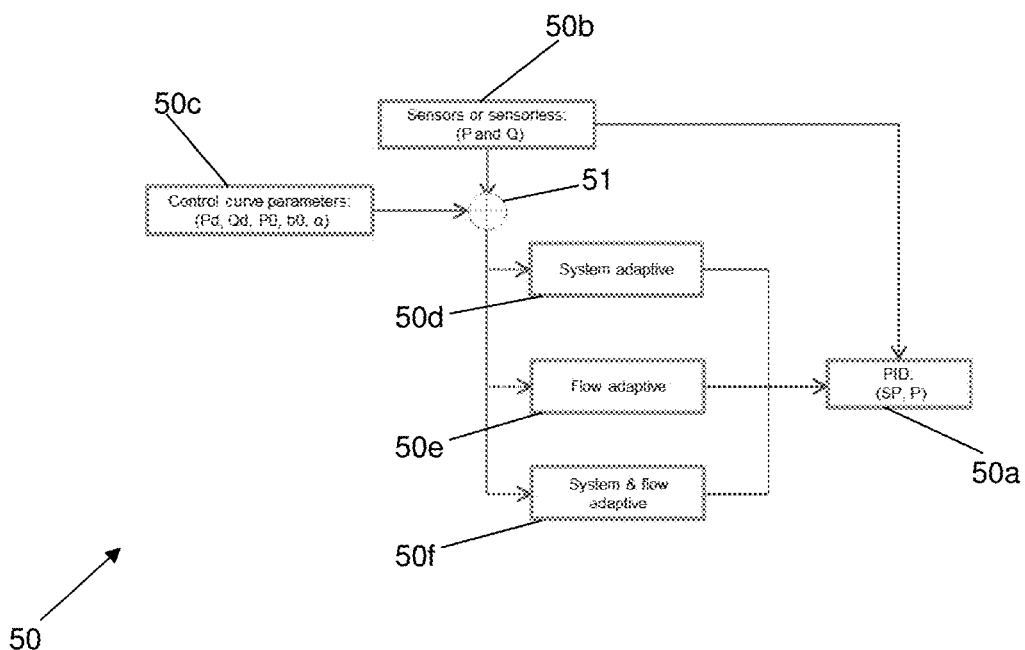
Figure 8: An energy saving control module for deriving adaptive pressure set point in real time based upon an instant system flow and pressure.

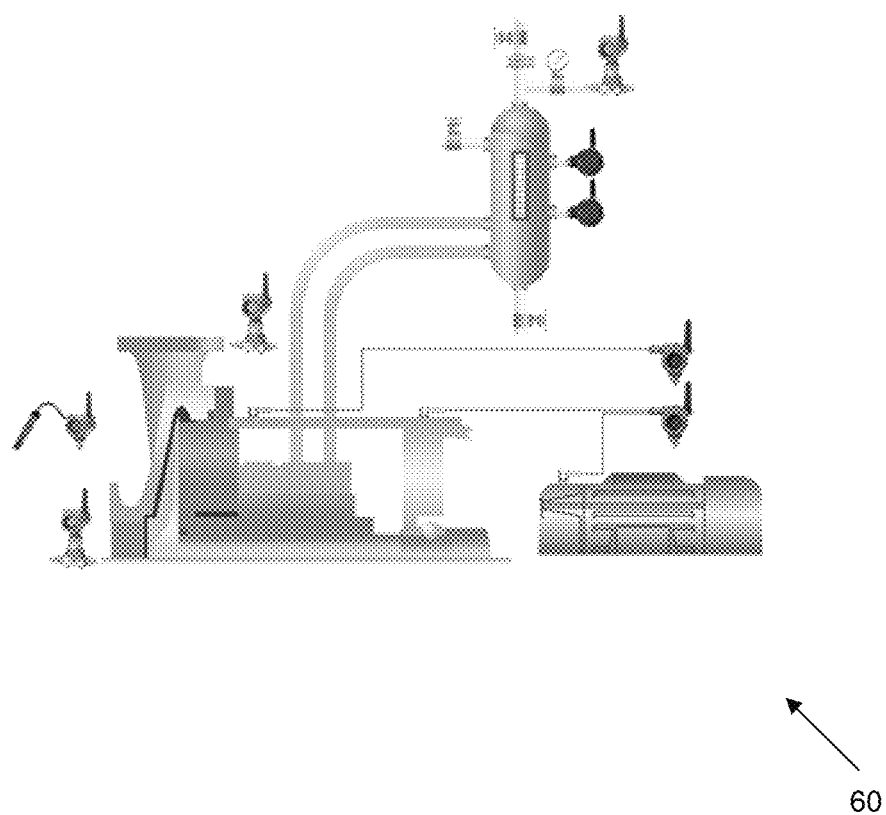
Figure 9: Pump monitoring and diagnostics adaptive control system.

ADVANCED REAL TIME GRAPHIC SENSORLESS ENERGY SAVING PUMP CONTROL SYSTEM

CROSS REFERENCE TO RELATED APPLICATION

This application claims benefit to U.S. provisional application No. 62/196,355, filed 24 Jul. 2015, entitled, "Advanced real time graphic sensorless energy saving pump control system," which is hereby incorporated by reference in its entirety.

The present invention builds on the family of technologies disclosed in the other related applications identified below.

BACKGROUND OF THE INVENTION

1. Field of the Invention

The present invention relates to a technique for controlling a pumping system and pumping related applications in such a pumping system.

2. Brief Description of Related Art

Pumping systems are known in structures, building or facilities, e.g., having HVAC heating and cooling, heat exchangers, pressure boosters, rainwater harvesting, geothermal heat pumps, fire protection, wastewater. Such pumping systems include or have pumps with speed and other control technology for controlling pumping processes. There is no known way to manage or control such pumping systems, e.g., using a centralized interactive real time graphic pump-system-control operation and monitoring display.

SUMMARY OF THE INVENTION

In summary, according to the present invention, a new and unique advanced real time graphic sensorless energy saving pump controller is provided, which includes primarily a real time graphic pump-system-control operation display and monitoring module, based upon the pump characteristics data selected from a pump data base together with the run time operation variables provided from energy saving control and sensorless converter modules. With a graphic touch screen, the run time pump and system characteristic and the corresponding control values under which the pump and system may be operated are presented in terms of a real time graphic and numerical display manner, which enables operators of the pump system to understand the pump_system_control operation status in real time, which allows pump system control in real time easier than the known systems in the prior art.

SPECIFIC EMBODIMENTS

By way of example, the present invention provides a new and unique technique for a pumping control application.

According to some embodiments, the present invention may include, or take the form of, a method or apparatus, e.g., in a hydronic pumping control applications or systems, featuring a signal processor or signal processing module, configured to:
  receive signaling containing information about real time pump operating parameters related to a multiplicity of pumps that form part of a pumping system in a plant or facility, and a user input selecting one of the multiplicity of pumps for selectively displaying the real time pump operating parameters on a control monitor to allow a plant or facility operator to implement a centralized pump control of the multiplicity of pumps in the plant or facility at a given centralized location; and
  determine corresponding signaling containing information to display on the control monitor the real time pump operating parameters to allow the plant or facility operator to implement the centralized control of the multiplicity of pumps in the plant or facility at the given centralized location, based upon the signaling received.

According to some embodiments, the present invention may include one or more of the following features:

The signal processor or processing module may be configured to provide the corresponding signaling to display on the control monitor the real time pump operating parameters, e.g., including for a hydronic pumping system.

The signal processor or processing module may be configured to:
  receive further signaling containing information about a further user input for controlling a selected one of the multiplicity of pumps; and
  determine further corresponding signaling containing information for controlling the selected one of the multiplicity of pumps.

The apparatus may include a combination of the control monitor and/or the multiplicity of pumps.

The signal processor or processing module may be configured to provide the further corresponding signaling to control the selected one of the multiplicity of pumps.

The signaling may contain information about pump characteristics data selected from a pump data base together with run time operation variables, e.g., for displaying in pump characteristic curves.

The apparatus may include one or more control modules, e.g., including energy saving control and/or sensorless converter modules that are configured to determine and provide the pump characteristics data.

The apparatus may include a smart device having a display as the control monitor, including a smart phone or tablet; and the smart device may include the signal processor or processing module that is configured to display on the display the real time pump operating parameters to allow the pump operator to implement the centralized control of the multiplicity of pumps in the plant or facility remotely using the smart device.

The real time pump operating parameters may include some combination of the following:
  pump, system and control curves in a real time manner inside of the pump operation region charted with a maximum pump curve and an end of curve;
  an instant flow rate;
  pressure;
  RPMs;
  watts; and
  PSI.

The apparatus may include, or take the form of, a pump controller for controlling a pump, e.g., in such a hydronic pumping system.

The apparatus may include, or take the form of, a hydronic pumping system having a pump and a pump controller, including where the pump controller is configured with the signal processor or processing module for controlling the pump.

By way of example, the signal processor or processing module may include, or take the form of, at least one signal processor and at least one memory including computer program code, and the at least one memory and computer program code are configured to, with at least one signal processor, to cause the signal processor at least to receive the signaling (or, for example, the further signaling) and determine the corresponding signaling, based upon the signaling received. The signal processor or processing module may be configured with suitable computer program code in order to implement suitable signal processing algorithms and/or functionality, consistent with that set forth herein.

According to some embodiments, the present invention may also take the form of a method including steps for:

receiving in a signal processor or processing module signaling containing information about real time pump operating parameters related to a multiplicity of pumps that form part of a pumping system in a plant or facility, and a user input selecting one of the multiplicity of pumps for selectively displaying the real time pump operating parameters on a control monitor to allow a plant or facility operator to implement a centralized pump control of the multiplicity of pumps in the plant or facility at a given centralized location; and determining in the signal processor or processing module corresponding signaling containing information to display on the control monitor the real time pump operating parameters to allow the plant or facility operator to implement the centralized control of the multiplicity of pumps in the plant or facility at the given centralized location, based upon the signaling received.

The method may also include one or more of the features set forth herein, including providing from the signal processor or processing module the corresponding signaling as control signaling to control a pump in a pumping system, e.g., including in such a hydronic pumping system.

The present invention provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 1 is a diagram of a building, structure or facility having one or more of HVAC heating and cooling, heat exchangers, pressure boosters, rainwater harvesting, geothermal heat pumps, fire protection, wastewater, etc., e.g., that may also include pumps having variable speed controls with advanced energy savings and sensorless control technology for controlling pumping processes.

FIG. 2A is a diagram of a real time graphic sensorless energy saving pump controller system configuration, according to some embodiments of the present invention.

FIG. 2B is a block diagram of apparatus, e.g., having a signal processor or processing module, according to some embodiments of the present invention.

FIG. 3 is a block diagram of system software functional modules, according to some embodiments of the present invention.

FIG. 4 is a block diagram of a flow chart for implementing input/output (I/O) control signal or signaling functionality, according to some embodiments of the present invention.

FIG. 5 is a diagram of real time sensorless energy savings pump controllers, according to some embodiments of the present invention.

FIG. 6 includes FIGS. 6A and 6B, which each show a diagram of a real time pump_system_control operation curves screen design layout and prototype panel display, e.g., for the real time sensorless energy savings pump controllers shown in FIG. 5, according to some embodiments of the present invention.

FIG. 7 is a block diagram of a sensorless control module for determining system flow rate and pressure from motor power and speed, according to some embodiments of the present invention.

FIG. 8 is a block diagram of an energy saving control module for deriving an adaptive pressure set point in real time based upon an instant system flow and pressure, according to some embodiments of the present invention.

FIG. 9 is a diagram of a pump monitoring and diagnostics adaptive control system, according to some embodiments of the present invention.

DETAILED DESCRIPTION OF THE INVENTION

1. Introduction

Recently, variable speed pump controls with advanced energy saving and sensorless control technologies were introduced in a family of applications set forth below for heating and cooling close loop hydronic applications, pressure booster, industrial and agriculture applications, e.g., consistent with that shown in FIG. 1. With all new technologies introduced, some traditionally unknown pump system operation parameters or characteristics curves, such as vary system characteristics curve, adaptive control set point, pressure or flow rate (without sensors), and so forth, become known and may be presentable back up to pump system design engineers and pump system control operators for better understanding the pump_system_control operation status in real time.

The present invention provides techniques for implementing real time graphic sensorless energy saving pump controllers, e.g., which may include a real time graphic pump-system-control operation display and monitoring module, based upon pump characteristics data selected from a pump data base as well as run time operation variables provided from an energy saving control module and a sensorless converter module integrated therewith. With the graphic touch screen in terms of real time graphic and numerical display, one can not only observe the pump and system characteristic information, such as the intersection of pump, system and control curves in a real time manner inside of the pump operation region charted with a maximum pump curve and end of curve, but can also observe corresponding control values such as instant flow rate and pressure, adaptive set point value, and so on so forth, under which pump is operated at the time as well. The present invention also provides, e.g., some other advanced modules, such as a vibration condition monitoring and control module with predictive maintenance information, as well as some advanced communication protocols, including a Web page service, a smart phone access, a building management system (BMS) interface, in addition to its basic pump operation functionalities.

2. Real Time Graphic Sensorless Energy Saving Pump Controllers

By way of example, FIG. 2A shows a real time graphic sensorless energy saving pump controller system configuration generally indicated as 5, having a combination of a real time graphic pump-system-control operation characteristics display and monitoring module 5a and a computer processing controller 5a' for implementing various control applications 5a", including heating and cooling, HVAC, submersibles and turbine pump system functionalities. The real time graphic pump-system-control operation characteristics display and monitoring module 5a may be configured with real time graphic sensorless energy saving pump controllers, e.g., which may includes various pump control or controller functionalities shown in modules 5b, 5c, 5d, 5e, 5f, 5g and 5h, as shown.

For example, one of the real time graphic sensorless energy saving pump controllers may include monitoring and control module 5b having a vibration condition monitoring and control module with predictive maintenance information, as well as power monitoring and prediction/prevention monitoring.

One of the real time graphic sensorless energy saving pump controllers may include a sensorless converter module 5c with given pump characteristics selected from a pump data base, including using 3D and BFA modelling, consistent with that disclosed herein One of the real time graphic sensorless energy saving pump controllers may include an energy saving control module 5d with an adaptive control set point based upon the instant system pressure and flow rate, e.g., that may be system adaptive, flow adaptive and both system and flow adaptive, consistent with that disclosed herein.

One of the real time graphic sensorless energy saving pump controllers may include a touch screen module 5e for implementing functionality related to displaying information, e.g. like real time operation curves or graphic interfaces, etc., consistent with that disclosed herein One of the real time graphic sensorless energy saving pump controllers may include an iCommunication module 5f for implementing advanced communication protocols module, including Web page service, smart phone access, BMS interface, besides its basic pump operation functionalities (e.g., drive communications). This advanced pump control system makes continuous communication between its functional modules in real time to update pump and system status, while its graphic tough screen implemented by the module 5e provides all run time pump/system/control operation characteristics curves, parameters, such as system pressure, flow rate, and adaptive setup point, in a graphic and numeric display manner, respectively.

One of the real time graphic sensorless energy saving pump controllers may include a language module 5g for implementing functionality related to choosing a language, including English, Chinese, or 22 or more other languages, consistent with that disclosed herein One of the real time graphic sensorless energy saving pump controllers may include a module 5h for implementing basic functionality related to multiple pumps, zones, and sensors; pump staging and alarms, consistent with that disclosed herein FIG. 3 shows a layout generally indicated as 20 of system software modules. The layout 20 includes a drive software module 22, a touch screen PLC module 24 and various other software modules 26. By way of example, the touch screen PLC module 24 may be configured to implement functionality related to pages/languages/keys. By way of further example, the various other software modules 26 may include one or more of the following:

- a drive communication module 26a for implementing drive communication functionality in relation to the drive module 22;
- a GUI & graphics module 26b for implementing GUI & graphics functionality in relation to the touch screen(s) PLC module 24 and the drive communication module 22;
- a pump control & BMS module 26c for implementing pump control & BMS functionality in relation to the drive communications module 26a and GUI & graphics module 26b;
- a vibration & power monitoring/control module 26d for implementing vibration & power monitoring/control functionality in relation to the control & BMS module 26c;
- a sensorless & energy saving control module 26e for implementing sensorless & energy saving control functionality in relation to the control & BMS module 26c;
- a database (DB) and search engine module 26f for implementing database (DB) and search engine functionality in relation to the sensorless & energy saving control module 26e; and
- a web/iPhone remote control module 26g for implementing web/iPhone remote control functionality in relation to the touch screen(s) PLC module 24.

The various other software modules 26 may be configured to implement the various software module functionalities consistent with that set forth herein, e.g., using a signal processor or processing module 10a, consistent with that disclosed in FIG. 2B.

FIG. 4 shows a flow chart generally indicated as 30 for implementing I/O control signal or signaling functionality between a drive module 22, a pump module 32 and various modules 32a, 32b, 32b, 32d, 32e and 32f, consistent with that set forth herein, e.g., including exchanging the corresponding input/output control signals and parameters between each individual control module, as shown.

By way of example, the various modules 30a through 30f may be configured to implement control signal or signaling functionality, as follows:

the sensorless converter module 30a may be configured to receive input signaling containing information about w (i.e., frequency) from the drive module 22, input signaling containing information about n (i.e., speed) from the PID control module 30f, and web/i Phone signaling containing information about database/setup parameters from the web/i Phone 30b, and provide sensorless converter signaling to the node module 30c;

the web/iPhone 30b may be configured to provide the web/i Phone signaling containing information about the database/setup parameters to the sensorless converter module 30a and the energy saving control module 30d;

the node module 30c may be configured to receive the sensorless converter signaling from the sensorless converter module 30a and sensor signaling from sensors 34, and provide node module signaling containing information about P, Q (i.e., pressure and flow) to the energy saving control module 30d and the PID control module 30f;

the energy saving control module 30d may be configured to receive the web/i Phone signaling containing database/setup parameters from the web/iPhone 30b and the node module signaling containing information about P, Q from the node module 30c, and provide energy saving control module signaling containing information about the SP (i.e., setpoint) to the real time graphics module 30e and the PID control module 30f;

the real time graphics module 30e may be configure to receive the energy saving control module signaling containing information about the SP from the energy saving control module 30d and provide/display real time graphics containing information about the SP, as well as other pump control functions and characteristic curves, e.g., consistent with that set forth herein; and the PID control module 30f may be configured to receive the node module signaling containing information about the P, Q from the node module 30c and the energy saving control module signaling containing information about the SP from the energy saving control module 30d, and provide the input signaling containing information about n to the drive module 22 and the sensorless converter module 30a via a feedback loop.

FIG. 5 shows examples of real time graphic sensorless energy saving pump controllers, according to the present invention, that may be used for most hydronic pumping control and monitoring applications, in terms of providing a real time and graphic display. The techniques may be applied to any form of pump characteristics distribution pump simple or complicated, such as for a series of wall, floor or pump mounted variable speed pump control system with advanced energy saving and sensorless control technology for heating and cooling close loop hydronic applications, pressure booster and industrial applications. The controller and variable speed drive system in this advanced platform according to the present invention may be configured with the basic functionality disclosed herein, e.g. so as to interface with and control a single pump or multiple pumps in the hydronic system as well.

3. Advanced Functional Modules

The functionalities disclosed for real time graphic sensorless energy saving pump controllers, according to the present invention, are detailed as following.

3.1) Real Time Pump_System_Control Characteristics Graphic Display

Real time graphic sensorless energy saving pump controllers may include, or take the form of, a graphic tough screen controller with real time pump_system_control operation curves and adaptive setup point display with multiple languages selection as following:

Graphic and tough screen,
Real time pump_system_control operation curves, and
Multiple languages supported.

The functionality may be configured to be interactive by the user, for providing suitable user inputs to implement the desired functionality.

The real time pump_system_control characteristics graphic display module like element 5a (see FIGS. 2A and 5) may be constructed based upon the input values from the sensorless converter and energy saving modules like elements 5c (FIG. 2A), 26e (FIG. 3) and 30a and 30d (FIG. 4) together with the pump characteristics data from the pump data base attached therewith, e.g., see element 30b (FIG. 4). FIG. 6 shows the real time pump_system_control operation characteristics curves and control parameters display screen design layout and its prototype PLC panel display.

With the real time graphic screen with a graphic and numerical display, one can not only observe the pump and system characteristic information such as the intersection of pump, system and control curves in a real time manner inside of the pump operation region charted with the maximum pump curve and end of curve, but one can also observe the corresponding control values such as instant flow rate and pressure, adaptive set point value, and so on so forth, under which pump is being operated in real time as well.

3.2) Sensorless Converters

As shown in FIG. 7, a sensorless converter module 40 may be configured to yield system pressure and flow rate values from a pair of instant motor power as well as speed values for a given pump(s).

By way of example, the sensorless converter 40a may be configured to receive from a node module 41 signaling containing information about design values Pd, Qd from a design values module 40a', pump characteristics from a pump characteristics data base module 40a" and speed tuning from a speed tuning module 40a''', and also receive input signaling containing information about inputs n and w, and provide output signaling containing information about P, Q for the given pump(s).

Several sensorless converters disclosed in the family of patents set forth herein may be integrated into real time graphic sensorless energy saving pump controllers software platform, including:

3D discrete calibrated sensorless converter,
Best fit affinity (BFA) sensorless converter, and
Direct numeric affinity (DNA) sensorless converter.

BFA and DNA sensorless converters may integrated with a company published pump data available in its data base. The corresponding sensorless converter theory, functions and parameters are set forth in the family of patent applications disclosed herein, e.g., see references [3-4 and 9] below.

See also that disclosed in relation to like elements 5c (FIG. 2A), 26e (FIG. 3) and 30a (FIG. 4).

3.3) Energy Saving Control

FIG. 8 shows an energy saving control functional module generally indicated as 50 that may be configured to yield an adaptive pressure control set point based upon its pump control curve (control equations) with respect to an instant system flow rate and/or pressure.

By way of example, in the energy saving control functional module 50, the PID control module 50a may be configured in relation to modules 50b, 50c, 50d, 50e, 50f and 51, as follows:

the node module 51 may be configured to receive sensor or sensorless signaling containing information about P and Q from the sensor or sensorless module 50b, and control curve parameter signaling containing information about Pd, Qd, P0, B0 and α from the control curve parameter module 50c, and provide node module signaling containing information about the same.

the system adaptive module 50d, flow adaptive module 50e and system & flow adaptive module 50f may be configured to receive the node module signaling and provide respectively system adaptive signaling, flow adaptive signaling and system & flow adaptive signaling, as shown.

the PID control module 50a may be configured to receive the sensors or sensorless signaling containing information about P, Q from the sensors or sensorless module 50b, as well as the system adaptive signaling, flow adaptive signaling and system & flow adaptive signaling from the system adaptive module 50d, flow adaptive module 50e and system & flow adaptive module 50f; and provide PID control signaling containing information about the SP (setpoint) and P (pressure) for implementing the energy savings control for any given pump in the pumping system.

Several energy saving control algorithms are disclosed in the family of patent applications set forth below, e.g., including reference nos. [1-2, 5, 7], which may be integrated into real time graphic sensorless energy saving pump controllers software platform, e.g., including:

System Adaptive Control (SAC),
Flow Adaptive Control (FAC),
System and Flow Adaptive Control (SFAC).

SAC may be used for deriving adaptive pressure set point with system flow regulated by control valves. FAC may be used for deriving adaptive pressure set point for system flow regulated by either control valves or circulators. SFAC may be used for deriving adaptive pressure set point for a varying system and flow regulated by either control valves or circulators, which may be operated in minimum operation energy consumption if the system is configured as proposed reference [7] below. Note that the flow and pressure signals for Energy Saving Control can be provided by a sensorless converter or by sensors as well. Adaptive Controls theory, functions and parameters are disclosed in further detail in the family of patent applications set forth herein.

3.4) Vibration Monitoring and Control

Pump monitoring and diagnostics can reduce cost, and save quite an amount of money, annually by reducing the overall maintenance costs. Maintenance is lowered since the use of predictive diagnostics enables early corrective actions that is less expensive than repairing a failed pump, as well as to avoid costly slowdowns and shutdowns. Pump monitoring and diagnostics adaptive control system is set forth herein, e.g., which may be integrated in real time graphic sensorless energy saving pump controllers as well. See FIG. 9.

3.5) Advanced Communication Protocols

Advanced communication protocols modules in Real Time Graphic
  Sensorless Energy Saving Pump Controllers may include:
  Building management system (BMS)
  Motor/Drive communications (MDC)
  Web access
  Smart phone access
BMS protocols include Modbus RTU/TCP, Bacnet IP/mstp, N2, and so forth. Motor/Drive communications software module for exchanging parameters between controller and drive may be integrated into Web and Smart phone access functionalities, as well.

3.6) Basic Pump Control Functionalities

Real Time Graphic Sensorless Energy Saving Pump Controllers may be designed or implemented on the top of a basic pump control software with all basic pump and system control functionalities and their corresponding set ups, e.g., including:
  Sensors (alternative to sensorless),
  Pumps,
  Systems,
  Test,
  Alarms and Logs,
etc. In general, the present invention may be implemented using several setup screens and sub-screens for their corresponding parameters setup as well.

FIG. 2B: Implementation of Signal Processing Functionality

By way of further example, FIG. 2B shows apparatus 10 according to some embodiments of the present invention for implementing the associated signal processing functionality. The apparatus features a signal processor or processing module 10a configured at least to:
  receive signaling containing information about real time pump operating parameters related to a multiplicity of pumps that form part of a pumping system in a plant or facility, and a user input selecting one of the multiplicity of pumps for displaying the real time pump operating parameters on a control monitor to allow a plant or facility operator to implement a centralized pump control of the multiplicity of pumps in the plant or facility at a given centralized location; and
  determine corresponding signaling containing information to display on the control monitor the real time pump operating parameters to allow the plant or facility operator to implement the centralized control of the multiplicity of pumps in the plant or facility at the given centralized location, based upon the signaling received.

In operation, the signal processor or processing module may be configured to provide corresponding signaling as control signaling to control a pump in a pumping system, e.g., such as a hydronic pumping system. The corresponding signaling may contain information used to control the pumping hydronic system.

The signal processor or processing module 10a may be configured in, or form part of, a pump system and/or a pump system control, e.g., which may include or be implemented in conjunction with one or more pump controls or controllers configured therein. By way of example, embodiments are envisioned in which the apparatus is a pump system having a pump system controller or controller with the signal processor or processing module 10a, and embodiments are envisioned in which the apparatus is, or takes the form of, the one or more pump controls or controllers having the signal processor or processing module 10a.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element 10a. One skilled in the art would be able to program with suitable program code such a microcontroller-based, or microprocessor-based, implementation to perform the functionality described herein without undue experimentation. For example, the signal processor or processing module 10a may be configured, e.g., by one skilled in the art without undue experimentation, to receive the signaling containing information about real time pump operating parameters related to a multiplicity of pumps that form part of a plant or facility, and a user input selecting one of the multiplicity of pumps for displaying the real time pump operating parameters on a control monitor to allow a plant or facility operator to implement a centralized pump control of the multiplicity of pumps in the plant or facility at a given centralized location, consistent with that disclosed herein.

Moreover, the signal processor or processing module 10a may be configured, e.g., by one skilled in the art without undue experimentation, to determine the corresponding signaling containing information to display on the control monitor the real time pump operating parameters to allow the plant or facility operator to implement the centralized control of the multiplicity of pumps in the plant or facility at the given centralized location, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processor or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by one skilled in the art.

Various Points of Novelty

The present invention may also include, or take the form of, one or more of the following embodiments/implementations:

According to some embodiments, the present invention may include, or take the form of, implementations where a real time graphic pump-system-control operation display and monitoring module is based upon the pump characteristics data selected from a pump data base as well as the run time operation variables provided from an energy saving control module and a sensorless converter module, which is schematically shown in FIGS. 2A-5. With a graphic touch screen, the run time pump and system characteristic and the corresponding control values under which pump and system are operated are presented in terms of a real time graphic and numerical display manner, which makes operators understood the pump_system_control operation status at the time better and easier.

According to some embodiments, the present invention may include, or take the form of, implementations where real time graphic pump-system-control operation display and monitoring module includes real time pump_system-_control operation characteristics curves and control variables display screen layout like that shown in FIG. 6. With the real time graphic screen with a graphic and numerical display, one can not only observe the pump and system characteristic information such as the intersection of pump, system and control curves in a real time manner inside of the pump operation region charted with maximum pump curve and end of curve, but the corresponding control values such as instant flow rate and pressure, adaptive set point value, and so on so forth, under which pump is operated at the time as well.

According to some embodiments, the present invention may include, or take the form of, implementations where the energy saving control technique set forth herein includes a control module which yields an adaptive pressure control set point based upon its pump control curve (control equations) with respect to an instant system flow rate and/or pressure, schematically shown in FIG. 7. The flow and pressure signals for Energy Saving Control set forth herein may be provided by a sensorless converter or by sensors as well. the energy saving control technique may be used for deriving adaptive pressure set point with system flow regulated by control valves or circulators, e.g., which may be operated in minimum operation energy consumption if the system is configured as disclosed in reference [7].

According to some embodiments, the present invention may include, or take the form of, implementations where the sensorless converter technique set forth herein may include the converter which yields system pressure and flow rate values from a pair of instant motor power as well as speed values, schematically shown in FIG. 8. By way of example, the sensorless converter technique set forth herein may be a discrete calibrated sensorless converter or numeric affinity sensorless converter, supported with pump characteristics data base with a self-tuning capability, e.g., as disclosed in references in [5 and 9] below.

According to some embodiments, the present invention may include, or take the form of, implementations where the Vibration Monitoring and Control technique set forth herein may include a pump vibration monitoring and diagnostics adaptive control system, e.g., which is shown schematically in FIG. 9.

According to some embodiments, the present invention may include, or take the form of, implementations where the Advanced Communication Protocols technique set forth herein may include Building management system (BMS), Motor/Drive communications (MDC), Web access, Smart phone access. BMS protocols include Modbus RTU/TCP, Bacnet IP/mstp, N2, and so forth. Motor/Drive communications software module for exchanging parameters between controller and drive may be integrated and/or implemented into Web and Smart phone access functionalities as well.

According to some embodiments, the present invention may include, or take the form of, implementations where the Basic Pump Control Functionalities technique set forth herein may include a basic pump control software with all basic pump and system control functionalities and their corresponding set ups including: Sensors (alternative to sensorless), Pumps, Systems, Test, Alarms and Logs, and so forth. In general, there may be several different setup screens and sub-screens for their corresponding parameters setup as well.

According to some embodiments, the present invention may include, or take the form of, implementations where the pumping hydronic system set forth herein may include all close loop or open loop hydronic pumping systems, such as primary pumping systems, secondary pumping systems, water circulating systems, and pressure booster systems. The systems set forth herein may consist of a single zone or multiple zones as well.

According to some embodiments, the present invention may include, or take the form of, implementations where the hydronic signals set forth herein may include pump differential pressure, system pressure or zone pressure, system or zone flow rate, and so forth.

The present invention regarding control signals transmitting and wiring technologies set forth herein may include all conventional sensing and transmitting technique that are used currently. Preferably, wireless sensor signal transmission technologies would be optimal and favorable.

According to some embodiments, the present invention may include, or take the form of, implementations where the pumps for the hydronic pumping systems set forth herein may include a single pump, a circulator, a group of parallel ganged pumps or circulators, a group of serial ganged pumps or circulators, or their combinations.

According to some embodiments, the present invention may include, or take the form of, implementations where systems flow regulation set forth herein may include manual or automatic control valves, manual or automatic control circulators, or their combinations.

Computer Program Product

The present invention may also, e. g., take the form of a computer program product having a computer readable medium with a computer executable code embedded therein for implementing the method, e.g., when run on a signal processing device that forms part of such a pump or valve controller. By way of example, the computer program product may, e. g., take the form of a CD, a floppy disk, a memory stick, a memory card, as well as other types or kind of memory devices that may store such a computer executable code on such a computer readable medium either now known or later developed in the future.

OTHER RELATED APPLICATIONS

The application is related to other patent applications that form part of the overall family of technologies developed by one or more of the inventors herein, and disclosed in the following applications:

[1] U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014; and

[2] U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

[3] U.S. application Ser. No. 14/091,795, filed 27 Nov. 2013, entitled "3D sensorless conversion method and apparatus," which claims benefit to U.S. provisional application No. 61/771,375, filed 1 Mar. 2013, now abandoned;

[4] U.S. application Ser. No. 14/187,817, filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

[5] U.S. application Ser. No. 14/339,594, filed 24 Jul. 2014, entitled "Sensorless Adaptive Pump Control with Self-Calibration Apparatus for Hydronic Pumping System," which claims benefit to U.S. provisional application Ser. No. 14/339,594, filed 24 Jul. 2014, now abandoned;

[6] U.S. application Ser. No. 14/680,667, filed 7 Apr. 2015, entitled "A Best-fit affinity sensorless conversion means for pump differential pressure and flow monitoring," which claims benefit to provisional patent application Ser. No. 61/976,749, filed 8 Apr. 2014, now abandoned; and

[7] U.S. application Ser. No. 14/730,871, filed 4 Jun. 2015, entitled "System and flow adaptive sensorless pumping control apparatus energy saving pumping applications," which claims benefit to provisional patent application Ser. No. 62/007,474, filed 4 Jun. 2014, now abandoned; and

[8] U.S. application Ser. No. 14/969,723, filed 15 Dec. 2015, entitled "Discrete valves flow rate converter," which claims benefit to U.S. provisional application No. 62/091,965, filed 15 Dec. 2014;

[9] U.S. application Ser. No. 15/044,670, filed 16 Feb. 2016, entitled "Detection means for sensorless pumping control applications," which claims benefit to U.S. provisional application No. 62/116,031, filed 13 Feb. 2015, entitled "No flow detection means for sensorless pumping control applications;"

[10] U.S. provisional application No. 62/196,355, filed 24 Jul. 2015, entitled "Advanced real time graphic sensorless energy saving pump control system;"

[11] U.S. provisional application No. 62/341,767, filed 26 May 2016, entitled "Direct numeric affinity multistage pumps sensorless converter;"

[12] U.S. provisional application No. 62/343,352, filed 31 May 2016, entitled "Pump control design toolbox means for variable speed pumping application;"

which are all assigned to the assignee of the instant patent application, and which are all incorporated by reference in their entirety herein.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. A pumping system having a multiplicity of pumps and forming part of a plant or facility, comprising:
   a controller having a control monitor and a signal processor or processing module, the controller configured to provide a centralized interactive real time graphic pump-system-control operation and monitoring display to manage and control the pumping system;
   the signal processor or processing module configured to:
      receive signaling containing information about
         real time pump operating parameters related to a multiplicity of pumps that form part of a pumping system in a plant or facility,
         a user input for graphically and numerically displaying for a selected pump of the multiplicity of pumps three operating curves, including pump, system and control operating curves, and corresponding control values related to the real time pump operating parameters on the control monitor to allow a plant or facility operator to view in the plant or facility at a given centralized location, and
         a further user input for controlling the selected pump in the pumping system; and
      provide corresponding signaling containing information about the pump, system and control operating curves and the corresponding control values related to the real time pump operating parameters for the selected pump of the multiplicity of pumps, and containing an adaptive set point for controlling the selected pump in the pumping system, based upon the signaling received; and
   the control monitor configured to receive the corresponding signaling, and display the pump, system and control operating curves and the corresponding control values related to the real time pump operating parameters for the selected pump of the multiplicity of pumps, based upon the corresponding signaling received.

2. A pumping system according to claim 1, wherein the signal processor or processing module is configured to provide the corresponding signaling to display on the control monitor the pump, system and control operating curves and the corresponding control values related to the real time pump operating parameters.

3. A pumping system according to claim 1, wherein the apparatus comprises a pump system having the controller with the control monitor and the signal processor or processing module for controlling the multiplicity of pumps.

4. A pumping system according to claim 1, wherein the pumping system comprises the multiplicity of pumps.

5. A pumping system according to claim 1, wherein the signaling contains information about pump characteristics data selected from a pump data base together with run time operation variables.

6. A pumping system according to claim 5, wherein the apparatus comprises energy saving control and sensorless converter modules that are configured to determine and provide the pump characteristics data.

7. A pumping system according to claim 1, wherein
the apparatus comprises a smart device having a display as the control monitor, including a smart phone or tablet; and
the smart device includes the signal processor or processing module that is configured to display on the display the real time pump operating parameters to allow the pump operator to implement the centralized control of the multiplicity of pumps in the plant or facility remotely using the smart device.

8. A pumping system according to claim 1, wherein the real time pump operating parameters include some combination of the following:
the pump, system and control operating curves in a real time manner inside of the pump operation region charted with a maximum pump curve and an end of curve;
an instant flow rate;
pressure;
RPMs;
Watts; and
PSI.

9. A method for controlling a pumping system having a multiplicity of pumps and forming part of a plant or facility comprising:
receiving in a controller configured to provide a centralized interactive real time graphic pump-system-control operation and monitoring display to manage and control the pumping system, the controller having a control monitor and a signal processor or processing module signaling containing information about
real time pump operating parameters related to a multiplicity of pumps that form part of a pumping system in a plant or facility,
a user input for graphically and numerically displaying for a selected pump of the multiplicity of pumps three operating curves, including pump, system and control operating curves, and corresponding control values related to the real time pump operating parameters on the control monitor to allow a plant or facility operator to view in the plant or facility at a given centralized location, and
a further user input for controlling the selected pump in the pumping system; and
providing with the signal processor or processing module corresponding signaling containing information about the pump, system and control operating curves and the corresponding control values related to the real time pump operating parameters for the selected pump of the multiplicity of pumps, and containing an adaptive set point for controlling the selected pump in the pumping system, based upon the signaling received;
receiving with the control monitor the corresponding signaling; and
displaying with the control monitor the pump, system and control operating curves and the corresponding control values related to the real time pump operating parameters for the selected pump of the multiplicity of pumps, based upon the corresponding signaling received.

10. A method according to claim 9, wherein the signal processor or processing module is configured to provide the corresponding signaling as control signaling containing information to control the selected pump of the multiplicity of pumps displayed on the control monitor, based upon the signaling received.

11. A pumping system according to claim 6, wherein the pumping system comprises a sensorless converter configured to receive a pair of instant motor power and speed values and provide sensorless converter signaling containing information about system pressure and flow rate values (P, Q).

12. A pumping system according to claim 11, wherein the sensorless converter is also configured to receive associated signaling containing information about system pressure and flow rate design values (Pd, Qd), pump characteristics data base values and speed tuning values and determine the sensorless converter signaling based upon the associated signaling received.

13. A pumping system according to claim 11, wherein the signaling received by the signal processor or processing module includes the sensorless converter signaling.

14. A pumping system according to claim 13, wherein the signal processor or processing module provide control signaling containing information to control the selected pump of the multiplicity of pumps displayed on the control monitor, based upon the signaling received.

15. A pumping system according to claim 5, wherein the pumping system comprises an energy saving control module configured to receive adaptive system and flow signaling containing information about adaptive pressure set point (SP) with system flow (Q) regulated by control valves or circulator, and sensor or sensorless signaling containing information about system pressure (P) and flow rate (Q) values, and provide energy saving control signaling containing information about a derived adaptive pressure set point (SP) in real time based upon an instant system flow and pressure.

16. A pumping system according to claim 15, wherein the signaling received by the signal processor or processing module includes the energy saving control signaling.

17. A pumping system according to claim 16, wherein the signal processor or processing module provide control signaling containing information to control the selected pump of the multiplicity of pumps displayed on the control monitor, based upon the signaling received.

18. A pumping system according to claim 1, wherein
the signaling received includes a further user input for controlling the selected pump of the multiplicity of pumps to allow the plant or facility operator to implement a centralized control of the multiplicity of pumps in the plant or facility at the given centralized location; and
the signal processor or processing module is configured to provide control signaling containing information to control the selected pump of the multiplicity of pumps displayed on the control monitor, based upon the signaling received.

19. A pumping system according to claim 1, wherein the control monitor is a touch screen monitor configured to provide a graphic user display to receive graphic user inputs.

20. A pumping system according to claim 1, wherein the corresponding signaling includes control signals for controlling the selected pump in the pumping system.

21. A pumping system according to claim 20, wherein the control signals include the adaptive set point for controlling the selected pump in the pumping system.

22. A pumping system comprising:
a multiplicity of pumps configured to respond to control signaling and pump fluid in the pumping system;
a controller having a control monitor and a signal processor or processing module, the controller configured to provide a centralized interactive real time graphic pump-system-control operation and monitoring display to manage and control the pumping system;

the signal processor or processing module configured to:
receive signaling containing information about
real time pump operating parameters related to a multiplicity of pumps that form part of a pumping system in a plant or facility,
a user input for graphically and numerically displaying for a selected pump of the multiplicity of pumps three operating curves, including pump, system and control operating curves, and corresponding control values related to the real time pump operating parameters on the control monitor to allow a plant or facility operator to view in the plant or facility at a given centralized location, and
a further user input for controlling the selected pump in the pumping system; and
provide corresponding signaling containing information about the pump, system and control operating curves and the corresponding control values related to the real time pump operating parameters for the selected pump of the multiplicity of pumps, and containing an adaptive setpoint for controlling the selected pump in the pumping system, based upon the signaling received;

the control monitor configured to receive the corresponding signaling, and display the pump, system and control operating curves and the corresponding control values related to the real time pump operating parameters for the selected pump of the multiplicity of pumps, based upon the corresponding signaling received; and the corresponding signaling including the control signaling, and the selected pump being configured to respond to the control signaling and pump the fluid in the pumping system.

\* \* \* \* \*